Figure 1:
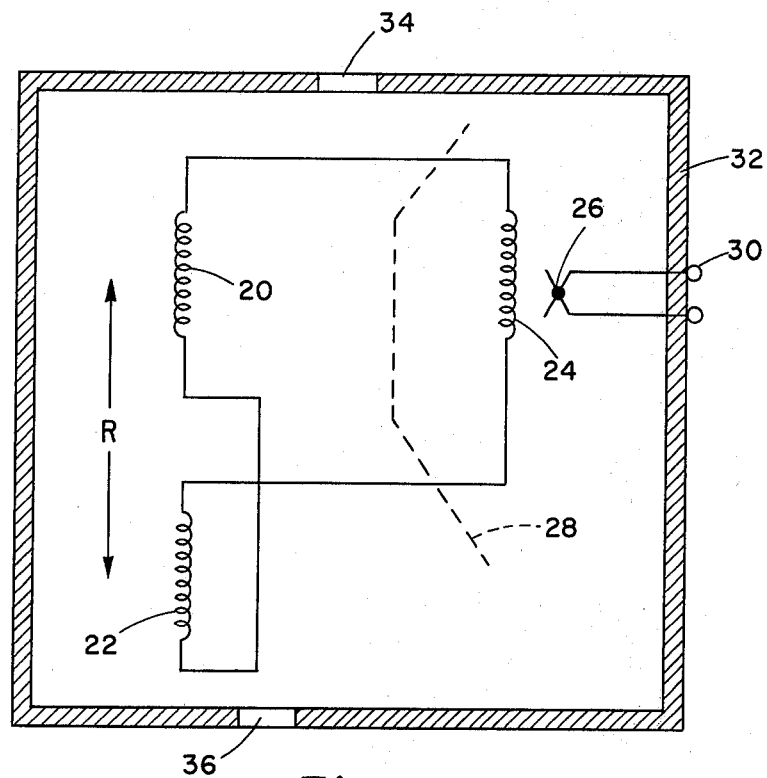

United States Patent [19]
Nicol

[11] 3,916,248
[45] Oct. 28, 1975

[54] SUPERCONDUCTIVE GRADIOMETRIC DEVICE

[75] Inventor: James Nicol, Dover, Mass.

[73] Assignee: The United States of America as represented by the Secretary of the Navy, Washington, D.C.

[22] Filed: Apr. 6, 1970

[21] Appl. No.: 25,921

[52] U.S. Cl. .............................................. 324/43 G
[51] Int. Cl.² ....................................... G01R 33/02
[58] Field of Search ........... 324/34 SL, 34 PS, 43 G, 324/112 D

[56] References Cited
UNITED STATES PATENTS

| | | | |
|---|---|---|---|
| 2,033,654 | 3/1936 | Selquist et al. | 324/34 P |
| 3,134,104 | 5/1964 | Murphree et al. | 343/112 D |
| 3,528,005 | 9/1970 | Morse et al. | 324/43 G |

*Primary Examiner*—Maynard R. Wilbur
*Assistant Examiner*—J. M. Potenza
*Attorney, Agent, or Firm*—R. S. Sciascia; L. I. Shrago

[57] ABSTRACT

A gradiometer in which two superconductive identical sensing coils are aligned with their axes parallel, the coils being spaced from one another along a common or another axis. The coils are series connected in opposition so that any net current flowing therein induced by a common field is proportional to a gradient in the field component parallel to the axes of the coils. This net current is detected by a superconductive sensor such as a Josephson Magnetometer tightly coupled to a drive coil connected as a load across the sensing coils, the superconductive sensor and the drive coil being magnetically shielded from the field to which the sensing coils are exposed.

A ranging system is formed of two such gradiometers by aligning the latter along a field gradient from a magnetic field source, obtaining scaled sum and differences of the signals from the gradiometers and providing the ratio of the sum and difference. The resulting ratio is proportional to the distance from the gradiometer to the field source.

7 Claims, 2 Drawing Figures

INVENTOR.
James Nicol

SUPERCONDUCTIVE GRADIOMETRIC DEVICE

This invention relates to magnetometrics, and more particularly to magnetic gradiometric ranging.

Remote detection and ranging of objects, having magnetic fields associated therewith, has long been a problem to which a host of solutions has been proposed. In instances where the detector and object are far apart and the magnetic fields are quite weak, the problem has been particularly aggravated because it becomes difficult to discriminate between the desired field and the earth's local field or other magnetic "noise".

It is therefore an object of the present invention to provide an improved system for remote detection of field gradients associated with magnetic masses.

The present invention has as a principal object the provision of a gradiometer using superconducting magnetic field sensing. Another object of the present invention is to provide a novel magnetic field gradiometer sufficiently compact to be readily portable, yet having sensitivity several orders of magnitude better than conventional prior art devices. Yet another object of the present invention is to provide a gradiometric device for determining the distance from the device to an object having an associated magnetic field.

Other objects of the present invention will in part appear obvious and will in part appear hereinafter. The invention accordingly comprises the combination of parts and the cooperative relation of elements which are exemplified in the following detailed disclosure, and the scope of the application of which will be indicated in the claims.

It is known that a magnetic field of a mass of magnetic material falls off approximately according to the inverse cube law, and hence at least along a line extending from the mass, a field gradient exists. Such gradient, of course, becomes smaller as one progresses away from the mass so that its detection at substantial distances from the mass requires highly sensitive instrumentation. Until recently, magnetic field measuring devices or magnetometers had a sensitivity and size such that a useful gradiometer required two magnetometers separated by, for example, several tens of feet. Uses for such gradiometers are extremely limited, and portability almost impossible.

Recently, a number of superconducting magnetic field sensors have been built that have sensitivities several orders of magnitude greater than previous devices and are quite compact in size, e.g., a few cubic millimeters. The operation of such sensors depends upon the use of one or more of the following attributes of superconductivity.

At temperatures below certain critical values, in magnetic fields also below critical values and when carrying currents lower than a critical amplitude, a superconductor exhibits zero dc resistance. These critical values vary according to the superconducting material and are functions of temperature, current and magnetic field. Type I superconductors, generally distinguished by the low value of critical fields and currents, are preferred for use in superconducting magnetic field sensors.

The occurrence of zero resistance alone is not an adequate description of the superconducting state because zero resistance implies that the magnetic field inside the superconductor is a constant finite value. Instead, the field inside a superconductor has been found to be always zero, provided that the applied field does not exceed the critical value. This property of flux exclusion from the interior of the superconductor is known as the Meissner effect, and is useful in forming a magnetometer. Such use, known to those skilled in the art, involves the transition between superconducting and normal states in the presence of a magnetic field. The transitional intermediate state encountered in practice may be affected by flux trapping and time dependent flux phenomena due to fluxoid conservation and quantization. Such effects can also be used for magnetic field sensing, at least in magnetometers for measuring small fields.

Lastly, where a thin barrier separates two bulk bodies of superconductor, a zero-voltage direct current can be driven across the barrier. This phenomenon, known as the Josephson effect or weak superconductivity, is characterized in that as the magnetic field to which the barrier or junction is exposed increases, the maximum value of the zero-voltage current quasiperiodically varies between zero and a peak value less than that in a zero field. A magnetometer can be built employing, for example, two such junctions in parallel.

Field sensitive devices using such effects are typically described in articles by B. S. Deaver, Jr., et al., in INSTRUMENTS 38, 311 (1967); J. E. Mercereau in JOURNAL OF APPLIED PHYSICS, 40, 1994 (1969); by J. M. Pierce in STANFORD UNIVERSITY HIGH ENERGY PHYSICS LAB. DEPT. NO. HEPL-514 (June 1967); J. E. Opfer in JOURNAL OF APPLIED PHYSICS, 40, 2100 (1969); R. L. Forgacs et al. in IEEE TRANSACTIONS ON INSTRUMENTATION AND MEASUREMENT, IM-15, 113 (1966); J. Clarke in PHIL. MAG., 13, 115 (1966); J. T. Harding et al. in JOURNAL OF APPLIED PHYSICS, 40, 2128 (1969); and many others.

Gradiometers hereinafter described based on any of the foregoing effects or attributes will employ at least two field or sense coils exposed to the magnetic field desired to be measured or sensed, connected to a drive coil which is coupled tightly to the sensing element of a Meissner, quantized-flux or Josephson type. Alternatively, the current from the field coils can be measured directly, e.g., as in a Clarke type of interferometer.

Briefly to effect the foregoing, and other objects, the present gradiometric magnetometer comprises a pair of identical superconducting induction coils connected in series and separated from one another, the coils being wound oppositely with their axes parallel. Thus, only a magnetic field gradient through the coils can produce a difference between the fluxes through the two coils, hence a net flux in the system, and hence a net current. This net current flows through the drive coil, creating a magnetic field that is sensed by a single superconductive magnetic field sensing element. By coupling two such gradiometers a "second derivative" gradiometer can be made, capable of measuring the range from the gradiometers to the source of the magnetic gradient being detected. The sense coils and drive coil together form a single continuous superconductive circuit.

Other objects of the present invention will in part be obvious and will in part appear hereinafter. The invention accordingly comprises the apparatus possessing the construction, combination of elements, and arrangement of parts which are exemplified by the following detailed disclosure, and the scope of the application of which will be indicated in the claims.

Figure 2:
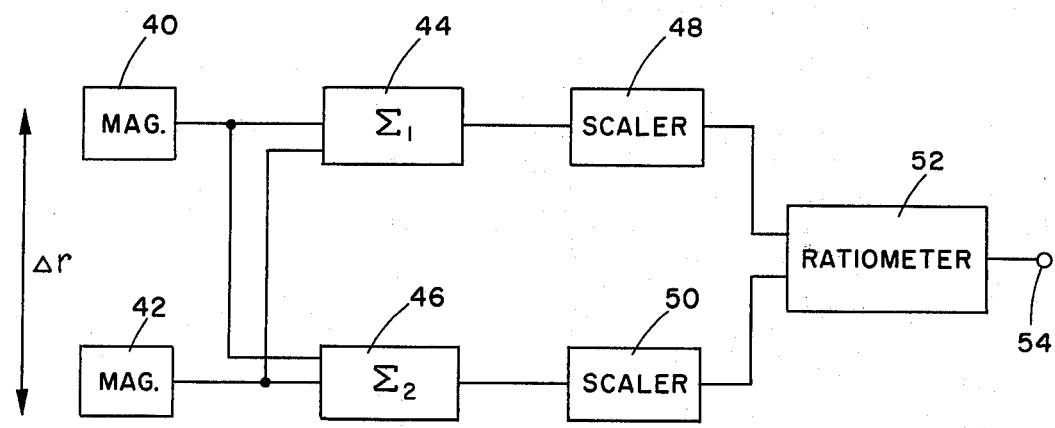

For a fuller understanding of the nature and objects of the present invention, reference should be had to the following detailed description taken in connection with the accompanying drawings wherein FIG. 1 is a schematic diagram of a gradiometer embodying the principles of the present invention; and FIG. 2 is a schematic diagram of a ranging gradiometric system employing gradiometers of FIG. 1.

In principle, two magnetometers of any of the types discussed above can be used to measure a field gradient. However, this is cumbersome and there are practical problems associated with comparing outputs of two similar but nonidentical devices when one wishes to measure very small differences between very large values.

Based upon the properties of superconductors, the present invention provides a field gradient measuring device using only one magnetic sensor. As shown in FIG. 1, the gradiometer of the present invention comprises a pair of identical sensing or field coils 20 and 22 oriented with their long axes substantially parallel and separated by a distance R between coil centers. A line between coil centers need not be parallel to the coil axes and indeed may even be perpendicular. Typically, R can be one meter or the like. Coils 20 and 22 are oppositely wound with respect to one another (i.e., one left-handed, the other right-handed) and are connected in series. Thus, they form one loop and exposure to a magnetic field which is the same at both coils will produce no net change in the net flux through the loop system. Coils 20 and 22 and their connections are of superconductive material. If a field gradient exists so that there is a corresponding difference in the fluxes between the coils, there will also be a net persistent current. Measurement of the latter provides a measure of the field gradient.

The current is measured by using any one of the superconducting magnetometric devices earlier discussed. For example, the net current can be allowed to circulate through a drive coil such as 24 tightly coupled to sense element 26, e.g., a Meissner, Josephson or quantized-flux magnetometer. Alternatively, it can be measured directly such as by connection of coupled coils 20 and 22 directly to a Clarke type of interferometer.

The detector formed of coil 24 and sense element 26 is physically remote from the field coils. Coil 24 can and should be shielded, as by magnetic shield 28, from direct exposure to ambient dc or low frequency magnetic field changes. Virtually zero-field shielding can be achieved by one or a combination of mu-metal shields, very slowly cooled superconducting shields, or inflatable superconducting shields. Magnetic shielding should also cover as much as possible of the leads within and outside of the device. When shielded from the earth's field, element 26 measures only the field created by the drive coil, perhaps $10^9$ times smaller than the earth's local field.

Of course, the most practical consideration for the use of superconducting magnetometers is the requirement of a low temperature environment when in operation. Operation at 4.2°K (boiling point of helium) is possible when using superconductors such as niobium and lead for the coils, but operation below the λ-point (ca. 2.1°K) is preferred to avoid noise due to boiling and the like. The ambient temperature should be kept stable to reduce dimensional changes in the coils that might introduce spurious signals. Means for providing such cooling are shown simply as enclosure 32 and inlet and outlet conduits 34 and 36 to the enclosure to allow circulation of coolant such as liquid helium.

The operation of the device shown in FIG. 1 can advantageously be described in connection with a magnetic field gradient (indicating by the double-headed arrow). For simplicity, it will be assumed that the coils 20 and 22 are oriented so that the field is parallel to the long axes of the coils. Because the system is superconductive, the total flux through the coils' circuit is constant. If the external field is changed from one value to another, a steady (dc) current is induced in the superconductive circuit to maintain the total flux within the circuit at its original value. The production of current occurs because the total flux in the system is not zero, or it at least differs from the condition when the system goes from a normal state to a superconductive state. When such an external field change occurs (or the system state changes) currents $I_{20}$ and $I_{22}$ are respectively induced in coils 20 and 22.

One can assume that there is no mutual inductance between the coils, and that coils 20 and 22 have the same number ($N$) of turns, the same areas ($A$) and equal self-inductances ($L$). Since the self-inductances of coils 20 and 22 are oppositely directed with respect to an external field, then $I_{20}$ and $I_{22}$ are opposite to one another. Now if the field $B_{20}$ at coil 20 differs (e.g., is greater) than the field $B_{22}$ at coil 22, then $I_{20} > I_{22}$ and the residual current will flow in the same direction as $I_{20}$ and opposite to $I_{22}$. Because coil 24 (having a self-inductance denoted $L_{24}$) is connected in series, then a common current $I$ will flow through the latter.

The requirement that flux be conserved then leads to the following relationships:

$$[NB_{20}A - LI] - [NB_{22}A - L(-I)] - L_{24}I = 0. \tag{1}$$

Simplifying
$$(B_{20}-B_{22})NA - 2LI - L_{24}I = 0; \tag{2}$$

and if we set $B_{20}-B_{22} = \Delta B$, then $$I = \frac{NA\Delta B}{2L+L_{24}}. \tag{3}$$

The current $I$ creates a flux $\phi$ and field $B_{24}$ in coil 24, defined by $$B_{24} = \frac{L_{24}I}{N_{24}A_{24}} = \frac{L_{24}}{N_{24}A_{24}} \left[\frac{NA\Delta B}{2L+L_{24}}\right] \tag{4}$$

where $N_{24}$ and $A_{24}$ are respectively the number of turns and area of coil 24.

Sense element 26 measures $B_{24}$ which as shown in proportional to $\Delta B$ and consequently is a measure of the derivative $\Delta B/\Delta R$ where $\Delta R$ is the distance between the centers of coils 20 and 22. The output of element 26 is, of course, an electrical signal proportional to $\Delta B/\Delta R$ and appearing across output terminals 30.

The field magnification ($F$) can be defined as a ratio which is the field at sensor coil 24 divided by the field difference between coils 20 and 22, as follows:

$$F = \frac{B_{24}}{\Delta B} = \frac{NA}{N_{24}A_{24}} \left[\frac{L_{24}}{2L+L_{24}}\right] \tag{5}$$

The bracketed term in the above equation is the ratio of the sensor coil inductance to the total circuit inductance. In the preferred embodiment, it is desirable to insure that L does not greatly exceed $L_{24}$ thereby avoiding making the bracketed term much less than unity. At the same time it is also desirable to insure that NA is greater than $N_{24}A_{24}$. This will then provide desirable field magnifications $\gg 1$. By making both coils 20 and 22 with large areas and small inductances and coil 24 with a much smaller area and a larger number of turns, one approaches a design according to these preferred parameters.

Referring now to FIG. 2 there is shown a block diagram of a system employing gradiometric devices of FIG. 1 to provide a ranging capability. The system includes first and second preferably identical gradiometers 40 and 42 such as are shown in FIG. 1, having superconductive coils and superconductive magnetometric sensors for measuring the local field gradient. The outputs of gradiometers 40 and 42 are respectively connected to a pair of input terminals of first summing circuit 44 and also the parallel pair of input terminals of second summing circuit 46. Summing circuit 44, for example a summing operational amplifier or similar known device, is of the type which provides an output signal which is the algebraic sum of the two input signals. Summing circuit 46, also well known in the art, is preferably a difference amplifier, i.e., provides an output signal which is the algebraic difference between the separate input signals at its input terminals. Hence, if the output signals from gradiometers 40 and 42 are respectively $E_1$ and $E_2$, then the output signal from circuit 44 is ($E_1+E_2$) and the output signal from circuit 46 is ($E_1-E_2$). Means shown as circuits 48 and 50 are respectively provided for scaling the signal sum and difference, and typically can be scaling operational amplifiers. The scaling functions can also be combined, in known manner, with summing functions if desired. Hence, the output signals of circuits 48 and 50 can respectively be designated as $K_1(E_1+E_2)$ and $K_2(E_1-E_2)$ where $K_1$ and $K_2$ are the scaling factors provided by the respective circuits.

Lastly, the output terminals of scaling circuits 48 and 50 are connected to respective inputs of ratiometric circuit 52. The latter, also well known in the art, provides an output signal which is a ratio of the respective input signals applied as its input terminals. Hence, the output signal of circuit 52 appearing at output terminal 54 can be described as $$K_3 \frac{(E_1+E_2)}{(E_1-E_2)}$$

where $K_3$ is a scaling factor determined at least in part by the ratio $K_1/K_2$ and such other scaling as may be desirably provided by circuit 52.

In operation, one can assume that gradiometers 40 and 42 each have their respective sensing coils aligned along at least a component of a magnetic field gradient shown as a double-ended arrow, the gradiometers also being aligned along the field gradient and separated from one another by a distance $\Delta r$ (typically measured center to center). If now the external field changes to induce current flow in the gradiometric coils, the output $E_1$ of gradiometer 40 can as previously noted be described as $$E_1 \approx \frac{\Delta B_1}{\Delta R} = \dot{B}_1 \tag{6}$$

where $\Delta B_1$ is the difference in the field sensed by the respective sensor coils in gradiometer 40. Similarly, the output $E_2$ of gradiometer 42 is $$E_2 \approx \frac{\Delta B_2}{\Delta R} = \dot{B}_2 \tag{7}$$

remembering that the two gradiometers are identical.

Because of the postulated field gradient the $\Delta B$ sensed by the gradiometer closer to the field source is greater than the $\Delta B$ sensed by the farther gradiometer, the output of circuit 44 can be expressed as $$E_1 + E_2 \approx K_1 \dot{B} \tag{8}$$

where $B$ is the average value of the field gradient found by the respective magnetometers and $K_1$ is the scaling factor.

By definition, the difference between the outputs of gradiometers 40 and 42 when divided by the separation $\Delta r$ is the second derivative of the average magnetic field gradient, or $$\frac{E_1 - E_2}{\Delta r} \approx \frac{\dot{B}_1 - \dot{B}_2}{\Delta r} = \ddot{B} \tag{9}$$

This can be rearranged to form $$\ddot{B} \approx K_2(E_1 - E_2) \tag{10}$$

and it will be recognized then that if $K_2$, a scaling factor is selected as proportional to $\Delta r$, equation (10) is substantially the output signal defined previously as provided by circuit 50. $B$ of course is the average value of the second derivative of $B$ with respect to r, or the first derivative of $B$ with respect to r.

If one considers a magnetic dipole, the field H on the dipole equator is found to be $H_D = M/D^3$ where $M$ is the dipole moment and $D$ is the radial distance from the dipole center to the point of observation. The first radial derivative of the field is $$dH/dD = -3M/D^4 = \dot{H} \tag{11}$$

The second radial derivative is $$\frac{d^2H}{dD^2} = +12M/D^5 = -\left(\frac{4}{D}\right)\dot{H} = \ddot{H} \tag{12}$$

From (10) by rearrangement $$|D| = 4\frac{\dot{H}}{\ddot{H}} \tag{13}$$

Substituting the values $\dot{B}$ and $\ddot{B}$ of equations (8) and (9) respectively into equation 13 in place of $\dot{H}$ and $\ddot{H}$ respectively, one finds one absolute value $|D|$, the distance from the center of the source of magnetic field (approximated here by the dipole) to be $$|D| = K_3 \frac{(E_1+E_2)}{(E_1-E_2)} \tag{14}$$

where $$K_3 \approx \frac{K_1}{K_2}$$

Equation (14) essentially expresses the signal output from ratiometer 52, and indicates that the system of FIG. 2 will provide a measure of the range from a magnetic field source to the instruments. This analysis of course is taken at the dipole equator, and when the system is not so located the analysis becomes considerably more complex although the conclusions are qualitatively the same.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A magnetometric system for determining the range to a source of magnetic field, and comprising in combination a first gradiometer having first and second sensing coils formed of superconductive material and spaced from one another, said coils being aligned so that their long axes are non-perpendicular to one another, said coils being series connected in opposed sense so as to form a continuous superconducting circuit, and superconductive means for detecting and producing first output signal proportional to the net current flowing through said coils;

a second like gradiometer spaced from said first gradiometer, for producing a second output signal proportional to the net current flowing in its coils;

means for adding the first and second signals and scaling the sum thereof to produce a sum signal;

means for producing a difference signal proportional to the difference between said first and second signals and scaled relative to the spacing between said magnetometers; and means for providing a system output signal proportional to the ration of said sum and difference signals, said output signal being proportional to said range.

2. A gradiometric system comprising, in combination first and second sensing coils formed of superconductive material, said coils be spaced from one another and aligned so that their long axes are non-perpendicular, said coils being connected in an electrical series relationship so as to form a continuous superconducting circuit such that the current induced in said coils by a common regular magnetic field oppose one another, superconductive means for detecting and for producing an output signal proportional to the net difference between said currents, said last mentioned means including a third coil formed of superconductive material and connected in series as a load across said first and second sensing coils so as to form a continuous closed superconducting current circuit and a superconductive sensor device responsive to magnetic field change and disposed adjacent said third coil so as to detect magnetic fields due to current flow through said third coil, and means for magnetically shielding said superconductive means for detecting and for producing said output signal from fields affecting said first and second sensing coils.

3. In a system as defined in claim 2 wherein said superconductive sensor device is a Meissner superconductive magnetometer.

4. In a system as defined in claim 2 wherein said superconductive sensor device is a Josephson superconductive magnetometer.

5. In a system as defined in claim 2 wherein said superconductive sensor device is quantized-flux superconductive magnetometer.

6. In an arrangement as defined in claim 2 wherein said first and second sensing coils are substantially identical.

7. In a system as defined in claim 6 wherein the cross-section of each of said first and second sensing coils is larger than the cross-section of said third coil and wherein the number of turns of said third coil is greater than the number of turns of each of said first and second sensing coils.

* * * * *